United States Patent Office 3,462,281
Patented Aug. 19, 1969

3,462,281
DRY FOOD PRODUCTS AND PROCESS FOR SAME
Robert L. Macy, Jr., Pennfield, Mich., assignor to Kellogg Company, Battle Creek, Mich., a corporation of Delaware
No Drawing. Filed Nov. 2, 1966, Ser. No. 591,424
Int. Cl. A23b 7/02, 1/04; B01d 1/00
U.S. Cl. 99—199                                    1 Claim

ABSTRACT OF THE DISCLOSURE

A method of freeze drying food in which frozen food is subjected to brief, intense heating of surfaces to slightly melt them, the food is then subjected to vacuum causing the melted surfaces to foam slightly or boil with the destruction of surface cells. The vacuum is maintained until evaporation causes refreezing of the surface, and then conventional freeze drying is conducted.

---

This invention relates to the production of dry foodstuffs such as fruits, vegetables, seafood, and animal products.

More particularly the present invention relates to improvements in the otherwise general technique of freeze drying fresh foodstuff.

The freeze drying process, as is well known, in general comprises the freezing of the foodstuff to be dried, disposing it in a zone of sub-atmospheric pressure, i.e. a vacuum chamber having heating means disposed therein, removing the water contained in the frozen foodstuff as ice by sublimation, condensing the latter in an adjacent chamber, and removing the dried foodstuff at a moisture content of about 2% or as desired.

The freeze-drying process is of advantage in that it serves to maintain the integrity or form of the product, as distinguished from vacuum drying which tends to unduly puff the product. However, it has been found that the freeze-drying process tends to unduly toughen, densify or "case-harden" the surface of the dried product so that the surface is substantially impermeable to moisture, with the result that the remainder of the product does not readily reconstitute in moisture.

It is the object of the present invention to overcome the foregoing difficulties and to produce dry, partially puffed food items with acceptable natural flavor, appearance, texture and rehydration and eating characteristics substantially similar to the fresh foods from which they originated, and at the same time be storage stable under room temperature conditions for reasonable lengths of time. The dry products can be used readily as additives to other food products such as cereals, soups, etc., or they can be eaten directly as snacks.

The objects of the present invention can be attained by subjecting pieces of the foodstuff to be freeze-dried to a preliminary treatment, namely a brief intense heat treatment of the surfaces of the frozen pieces to slightly melt them, following which the pieces are promptly placed in the vacuum drying chamber of the freeze-drying apparatus and therein subjected to vacuum, before raising the temperature therein. This causes the melted surfaces of the food pieces to foam slightly or boil with destruction of the surface cells. The vacuum is maintained until evaporation of the moisture from the melted surfaces of the food pieces causes the food to re-freeze at the surface, following which conventional freeze-drying technique is conducted to finish drying the food items. This pretreatment prevents formation of a hard glazed surface which would otherwise interfere with rehydration or cause undesirable appearance of the food item.

The process of the present invention is generally carried out by slicing food items of relatively large volume to slices of about ⅛ inch to ½ inch in thickness. Other food items which are naturally in this thickness range do not require slicing. The pieces of the food item are then spread in a single layer on trays and frozen to a temperature of about −20 to about −40° F. These frozen items are then briefly subjected to relatively intense, uniform heat which causes the outermost layers or surfaces of the food items to melt without causing the interiors of individual food pieces to thaw appreciably. The frozen centers of the individual food pieces maintain the natural shape and integrity of the individual food pieces. These heat treated food pieces are then transferred, before further melting occurs, to the vacuum chamber of a freeze drying apparatus and the pressure therein reduced to less than 100 microns mercury, as it is conventional in freeze drying. This causes the melted surfaces of the food items to foam slightly. The reduced pressure is maintained until evaporation of moisture from the melted surfaces of the food pieces causes the food to refreeze at the surface.

The trays of food pieces are then permitted to remain in the vacuum chamber of the freeze drying apparatus and conventional freeze drying technique is then continued to finish drying the food items accompanied by conventional heating of the vacuum chamber to raise the temperature therein to a degree sufficient to accomplish sublimation while retaining the pieces in frozen condition so that the frozen water content of the food pieces as ice is directly sublimed off and condensed in an adjacent chamber, and the dried pieces recovered at a moisture of approximately 2%.

The following are specific examples of the process of the present invention:

EXAMPLE 1

Fresh ripe bananas are sliced to pieces of 3/16 inch in thickness and frozen at −40° F. while spread out on a tray. The frozen banana slices are then passed through intense heating means such as an apparatus having closely spaced rows of infrared light arranged 4 inches above and 4 inches below the frozen slices, at a rate of about 6 seconds per inch or for a total period of about 60 seconds. These heat treated slices are then transferred to a vacuum chamber of a conventional freeze drying apparatus and the pressure lowered therein to less than 100 microns mercury before further melting occurs. Reduced pressure is then maintained for about 10 minutes before the platen temperature of the radiant heating means in said chamber is raised to 190° F. for conventional freeze drying finishing. Thereafter the freeze-dried product is recovered at a moisture content of about 2%.

The product was readily reconstituted on addition of milk.

EXAMPLE 2

In a similar process fresh oysters are spread on trays and quickly frozen at −20° F. The frozen product was then heated as in the foregoing example with a rate of passage of the frozen product through the infrared heating apparatus of about 9 seconds per inch for a total of about 90 seconds. The surface-melted frozen pieces were then placed on trays in the vacuum chamber of a freeze drying apparatus, dried therein first under vacuum without heat until refrozen as above, and then finish dried in the conventional freeze drying technique. The dried product was readily reconstituted on cooking in water.

In lieu of the infrared heating means described in the foregoing, any intense uniform zone of heating may be employed to cause surface melting. The rate of passage of the product through the heated zone may be varied to accommodate any specific product. The amount of foaming on the surface of the individual food pieces may be varied using pressures in the range of 0 to 100 millimeters mercury absolute, until refrozen, and before freeze-drying.

I claim:

1. In a process for freeze drying a fresh frozen foodstuff wherein the frozen pieces of the foodstuff to be dried are introduced to a zone of sub-atmospheric pressure and the temperature of the foodstuff raised therein in a manner whereby the water present in the foodstuff as ice is substantially removed by sublimation, the improvement which comprises, first subjecting the surfaces of the frozen foodstuff pieces to intense heat for a short period of time, before introducing them to said zone, to cause melting at said surfaces without appreciable interior thawing, then promptly introducing them to said vacuum zone, and subjecting them therein to reduced pressure, before raising the temperature therein, to cause said surfaces to slightly foam and until evaporation of moisture from the melted surfaces causes the foodstuff to re-freeze at the surfaces, and then raising the temperature in said zone while maintaining reduced pressure to effect freeze drying.

References Cited

UNITED STATES PATENTS 3,395,022    7/1968    Vollink et al. _____ 99—83

A. LOUIS MONACELL, Primary Examiner

R. B. ANDEWELT, Assistant Examiner

U.S. Cl. X.R.

99—204, 208, 209